(12) United States Patent
Surpi et al.

(10) Patent No.: US 10,395,540 B2
(45) Date of Patent: Aug. 27, 2019

(54) PROXIMITY EVENT DETERMINATION WITH LANE CHANGE INFORMATION

(71) Applicant: Lytx, Inc., San Diego, CA (US)

(72) Inventors: Gabriela Surpi, San Diego, CA (US); Timothy Edmonds, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

(21) Appl. No.: 15/641,748

(22) Filed: Jul. 5, 2017

(65) Prior Publication Data

US 2017/0365172 A1   Dec. 21, 2017

Related U.S. Application Data

(63) Continuation of application No. 14/885,254, filed on Oct. 16, 2015, now Pat. No. 9,734,717.

(51) Int. Cl.
*G08G 1/16* (2006.01)
*B60W 40/10* (2012.01)
*G06K 9/00* (2006.01)

(52) U.S. Cl.
CPC ............. *G08G 1/166* (2013.01); *B60W 40/10* (2013.01); *G06K 9/00791* (2013.01); *G08G 1/167* (2013.01)

(58) Field of Classification Search
CPC .... G08G 1/166; G08G 1/167; G06K 9/00791; B60W 40/10
USPC ......................................................... 701/301
See application file for complete search history.

(56) References Cited

U.S. PATENT DOCUMENTS

| | | | |
|---|---|---|---|
| 2003/0069695 A1* | 4/2003 | Imanishi | B60R 1/00 701/301 |
| 2011/0063099 A1 | 3/2011 | Miller | |
| 2016/0101729 A1* | 4/2016 | Burke | G01S 13/931 701/36 |

* cited by examiner

*Primary Examiner* — Brian P Sweeney
(74) *Attorney, Agent, or Firm* — Van Pelt, Yi & James LLP

(57) ABSTRACT

A system for determining proximity events includes an input interface and a processor. The input interface is to receive a lane change information. The processor is to determine a proximity event based at least in part on the lane change information.

21 Claims, 13 Drawing Sheets

PROXIMITY EVENT DETERMINATION WITH LANE CHANGE INFORMATION

CROSS REFERENCE TO OTHER APPLICATIONS

This application is a continuation of U.S. patent application Ser. No. 14/885,254, issued as U.S. Pat. No. 9,734,717, entitled PROXIMITY EVENT DETERMINATION WITH LANE CHANGE INFORMATION filed Oct. 16, 2015 which is incorporated herein by reference for all purposes.

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder typically includes a set of sensors, e.g., video recorders, audio recorders, accelerometers, gyroscopes, vehicle state sensors, GPS (global positioning system), etc., that report data, which is used to determine the occurrence of an anomalous event. Sensor data can then be transmitted to an external reviewing system. Anomalous event types include accident anomalous events, maneuver anomalous events, location anomalous events, proximity anomalous events, vehicle malfunction anomalous events, driver behavior anomalous events, or any other anomalous event types. However, when new sensors are developed, they need to be incorporated into the detection system for anomalous events.

BRIEF DESCRIPTION OF THE DRAWINGS

Various embodiments of the invention are disclosed in the following detailed description and the accompanying drawings.

DETAILED DESCRIPTION

Figure 1:
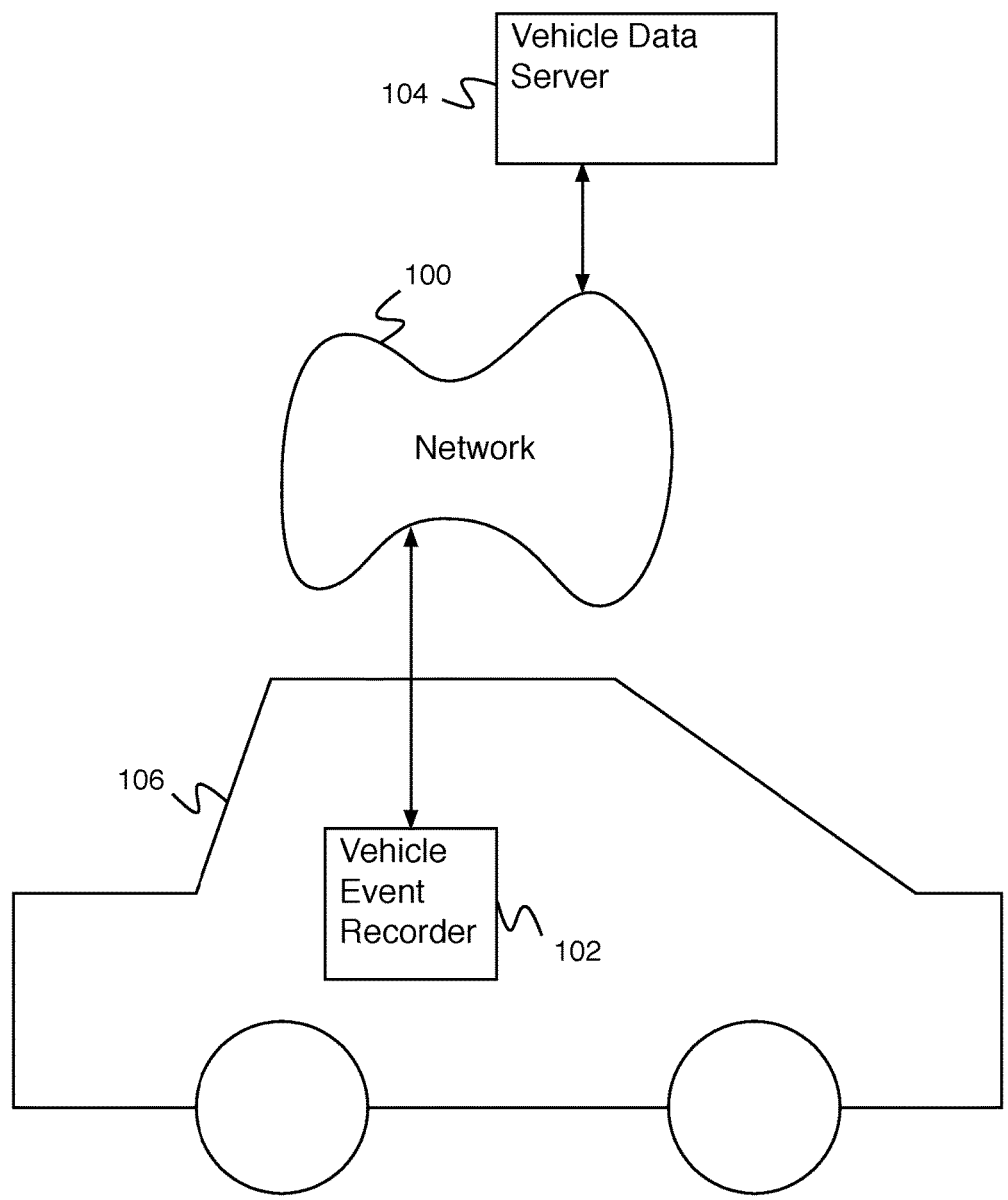
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining proximity events comprises an input interface for receiving a lane change information and a processor for determining a proximity event based at least in part on the lane change information. In some embodiments, the system for determining proximity events additionally comprises a memory coupled to the processor and configured to provide the processor with instructions.

In some embodiments, a system for determining proximity events comprises a vehicle event recorder coupled to a proximity sensor for determining forward proximity measurements. The proximity sensor provides the forward proximity measurements to a proximity event system and a lane change determiner. In some embodiments, the proximity event system determines and provides proximity events based at least in part on the forward proximity measurements and on lane change determinations from the lane change determiner, where a determination of proximity events based on proximity measurements and on lane change determinations is an improvement over events based only on proximity measurements. Proximity events comprise anomalous events determined by a vehicle event recorder for a vehicle that follows too closely the vehicle in front of it. The lane change determiner provides lane leaving events (e.g., an event in which a vehicle with a vehicle event recorder leaves a lane or moves over a lane marker) and cut off events (e.g., an event in which a vehicle changes lanes immediately in front of the vehicle with a vehicle event recorder). In some embodiments, in the event a lane change event occurs near in time to a proximity event, the proximity event is not provided as an event (e.g., not transferred to a server as an event, not stored at a server as an event, etc.).

In some embodiments, in the event a vehicle comes within the proximity time threshold of the vehicle preceding it (e.g., gets too close to the car in front) then shifts lanes within a sustained proximity time threshold (e.g., changes lanes after just a short time of being too close), the proximity event is not provided as an event (e.g., not transferred to a server as an event, not stored at a server as an event, etc.). In some embodiments, in the event that a vehicle is cut off by a vehicle shifting into its lane but increases the following distance to greater than the proximity time threshold within an extended sustained proximity time threshold, the proximity event is not provided as an event (e.g., not transferred to a server as an event, not stored at a server as an event, etc.).

FIG. 1 is a block diagram illustrating an embodiment of a system including a vehicle event recorder. Vehicle event recorder 102 comprises a vehicle event recorder mounted in a vehicle (e.g., a car or truck). In some embodiments, vehicle event recorder 102 includes or is in communication with a set of sensors—for example, video recorders, audio recorders, accelerometers, gyroscopes, vehicle state sensors, proximity sensors, a global positioning system (e.g., GPS), outdoor temperature sensors, moisture sensors, laser line tracker sensors, or any other appropriate sensors. In various embodiments, vehicle state sensors comprise a speedometer, an accelerator pedal sensor, a brake pedal sensor, an engine revolutions per minute (e.g., RPM) sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, vehicle event recorder 102 comprises a system for processing sensor data and detecting events. In some embodiments, vehicle event recorder 102 comprises map data. In some embodiments, vehicle event recorder 102 comprises a system for detecting risky behavior. In some embodiments, vehicle event recorder 102 comprises a system for detecting vehicle proximity events. In various embodiments, vehicle event recorder 102 is mounted on vehicle 106 in one of the following locations: the chassis, the front grill, the dashboard, the rear-view mirror, or any other appropriate location. In some embodiments, vehicle event recorder 102 comprises multiple units mounted in different locations in vehicle 106. In some embodiments, vehicle event recorder 102 comprises a communications system for communicating with network 100. In various embodiments, network 100 comprises a wireless network, a wired network, a cellular network, a code division multiple access (CDMA) network, a global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a local area network, a wide area network, the Internet, or any other appropriate network. In some embodiments, network 100 comprises multiple networks, changing over time and location. In some embodiments, different networks comprising network 100 comprise different bandwidth cost (e.g., a wired network has a very low cost, a wireless Ethernet connection has a moderate cost, a cellular data network has a high cost). In some embodiments, network 100 has a different cost at different times (e.g., a higher cost during the day and a lower cost at night). Vehicle event recorder 102 communicates with vehicle data server 104 via network 100. Vehicle event recorder 102 is mounted to vehicle 106. In various embodiments, vehicle 106 comprises a car, a truck, a commercial vehicle, or any other appropriate vehicle. Vehicle data server 104 comprises a vehicle data server for collecting events and risky behavior detected by vehicle event recorder 102. In some embodiments, vehicle data server 104 comprises a system for collecting data from multiple vehicle event recorders. In some embodiments, vehicle data server 104 comprises a system for analyzing vehicle event recorder data. In some embodiments, vehicle data server 104 comprises a system for displaying vehicle event recorder data. In some embodiments, vehicle data server 104 is located at a home station (e.g., a shipping company office, a taxi dispatcher, a truck depot, etc.). In some embodiments, events recorded by vehicle event recorder 102 are downloaded to vehicle data server 104 when vehicle 106 arrives at the home station. In various embodiments, vehicle data server 104 is located at a colocation center (e.g., a data center where equipment, space and bandwidth are available for rental), at a cloud service provider, at a remote location, or any other appropriate location. In some embodiments, events recorded by vehicle event recorder 102 are downloaded to vehicle data server 104 wirelessly. In some embodiments, a subset of events recorded by vehicle event recorder 102 is downloaded to vehicle data server 104 wirelessly. In some embodiments, vehicle event recorder 102 comprises a system for managing a camera.

Figure 2:
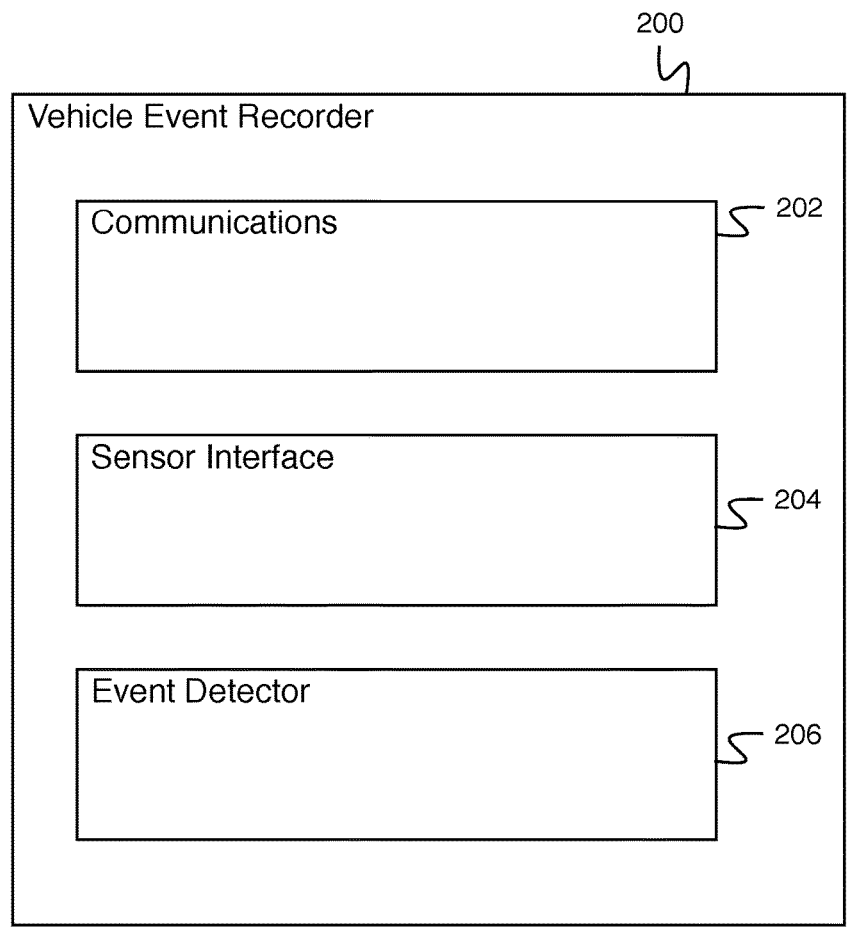
FIG. 2 is a block diagram illustrating an embodiment of a vehicle event recorder.

FIG. 2 is a block diagram illustrating an embodiment of a vehicle event recorder. In some embodiments, vehicle event recorder 200 of FIG. 2 comprises vehicle event recorder 102 of FIG. 1. In the example shown, vehicle event recorder 200 comprises communications 202. In various embodiments, communications 202 comprises local communications (e.g., communications with a driver, passenger, vehicle technician, etc.), remote communications (e.g., communications over a network), wired communications, wireless communications, communications over a Global System for Mobile (e.g., GSM) network, communications over a Code Division Multiple Access (e.g., CDMA) network, communications over a cellular network, communications over a WiFi network, communications over an Ethernet network, communications over a Universal Serial Bus (e.g., USB), communications over Bluetooth, communications over the Internet, communications using LTE, communications using UMTS, communications using WiMax, communications using DSRC, or any other appropriate communications. In some embodiments, communications 202 is implemented as an interface. In some embodiments, communications 202 is implemented using a processor. Sensor interface 204 comprises an interface to one or more vehicle event recorder sensors. In various embodiments, vehicle event recorder sensors comprise an external video camera, an internal video camera, a microphone, an accelerometer, a gyroscope, an outdoor temperature sensor, a moisture sensor, a laser line tracker sensor, vehicle state sensors, or any other appropriate sensors. In various embodiments, vehicle state sensors comprise a speedometer, an accelerator pedal sensor, a brake pedal sensor, an engine RPM sensor, a distance to forward vehicle sensor, a proximity sensor, an engine temperature sensor, a headlight sensor, an airbag deployment sensor, driver and passenger seat weight sensors, an anti-locking brake sensor, an engine exhaust sensor, a gear position sensor, a cabin equipment operation sensor, or any other appropriate vehicle state sensors. In some embodiments, sensor interface 208 comprises an on-board diagnostics (OBD) bus (e.g., society of automotive engineers (SAE) J1939, J1708/J1587, OBD-II, CAN BUS, etc.). In some embodiments, sensor interface 204 is implemented using a processor. In some embodiments, vehicle event recorder 200 communicates with vehicle state sensors via OBD bus. Event detector 206 comprises an event detector for detecting anomalous events. In various embodiments, anomalous events comprise accident events, maneuver events, proximity events, or any other appropriate anomalous events. In some embodiments, anomalous events are determined based at least in part on sensor data (e.g., sensor data received via sensor interface 204). In some embodiments, event detector 206 is implemented using a processor. In various embodiments, the elements of vehicle event recorder 200 are implemented all on a single processor, each on their own processor, or combined on multiple processors in any appropriate way. In some embodiments, vehicle event recorder 200 additionally comprises a memory coupled to the one or more processors. In various embodiments, the memory comprises a magnetic memory, an optical memory, a solid-state memory, a flash memory, a non-volatile memory, a read-only memory, a tape memory, a disc memory, or any other appropriate memory.

Figure 3:
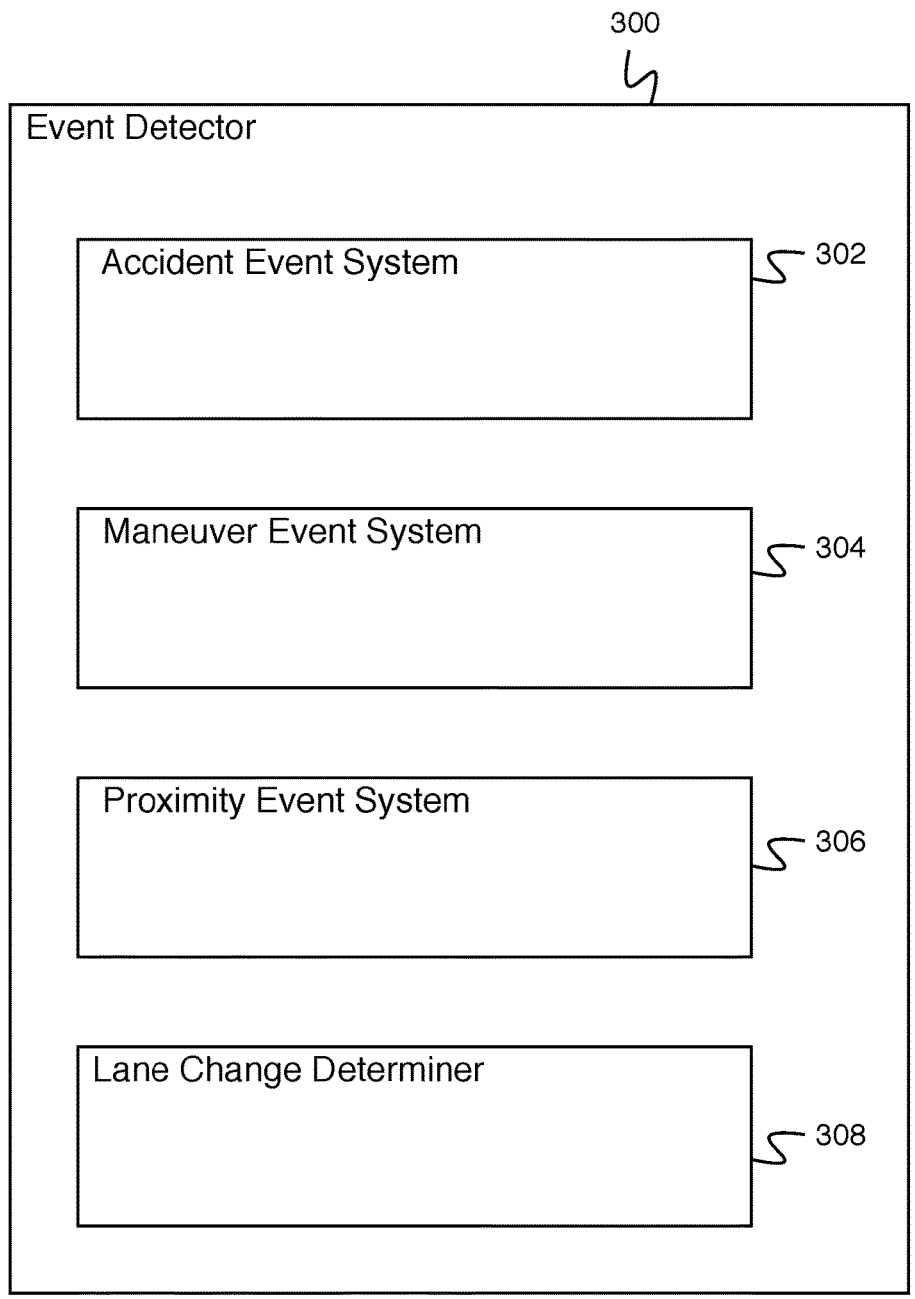
FIG. 3 is a block diagram illustrating an embodiment of an event detector.

FIG. 3 is a block diagram illustrating an embodiment of an event detector. In some embodiments, event detector 300 comprises event detector 206 of FIG. 2. In the example shown, event detector 300 comprises a set of event systems (e.g., accident event system 302, maneuver event system 304, and proximity event system 306). Event systems comprise systems for detecting events using sensor data. In some embodiments, accident event system 302 comprises a system for detecting accident events using accelerometer data. In some embodiments, accident event system 302 is implemented using a processor. In some embodiments, maneuver event system 304 comprises a system for detecting maneuver events (e.g., aggressive acceleration events, speeding events, hard cornering events, hard braking events, etc.). In various embodiments, maneuver event system 304 detects events using accelerometer data, video data, speedometer data, steering data, or any other appropriate data. In some embodiments, maneuver event system 304 is implemented using a processor. In some embodiments, proximity event system 306 comprises a system for determining proximity events (e.g., events in which the vehicle is following too close). In various embodiments, proximity event system 306 uses proximity data (e.g., from a proximity sensor), video data, speedometer data, lane change data, or any other appropriate data. In some embodiments, proximity event system 304 is implemented using a processor. In some embodiments, lane change determiner 308 comprises a lane change determiner for determining lane change data. In various embodiments, lane change data comprises safe lane change data, lane leaving data, cut off data, moving over a lane marker data, or any other appropriate lane change data. In some embodiments, lane change determiner 308 is implemented using a processor. In some embodiments, lane change data determined by lane change determiner 308 is used by proximity event system 306 for determining proximity events. In various embodiments, event detector 300 additionally comprises a location event system for determining location-based events, a driver behavior event system for determining driver behavior events, a vehicle malfunction event system for determining vehicle malfunction events, or any other appropriate event system.

Figure 4:
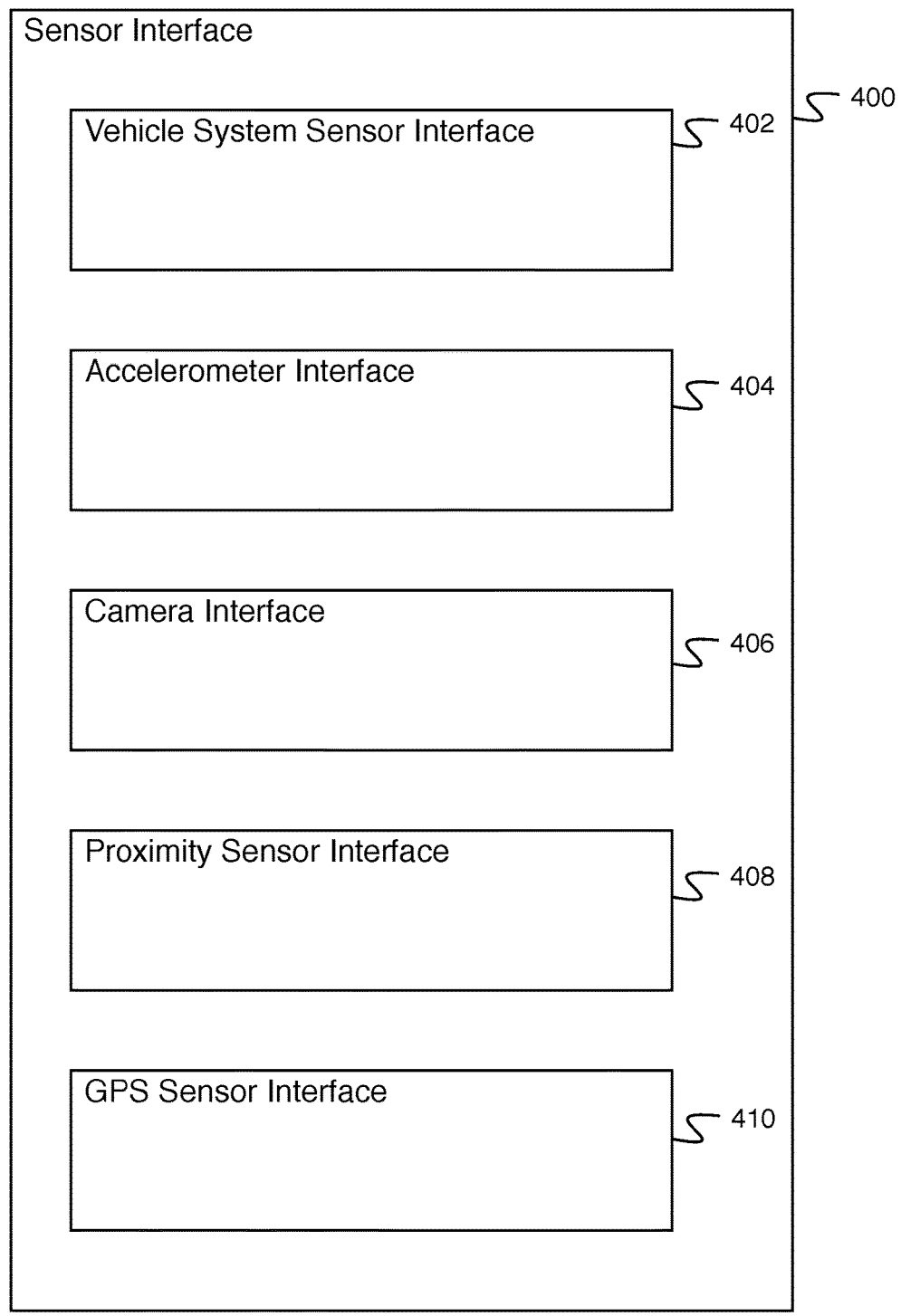
FIG. 4 is a block diagram illustrating an embodiment of a sensor interface.

FIG. 4 is a block diagram illustrating an embodiment of a sensor interface. In some embodiments, sensor interface 400 comprises sensor interface 204 of FIG. 2. In the example shown, sensor interface 400 comprises vehicle system sensor interface 402 for communicating with vehicle system sensors. In some embodiments, vehicle system sensor interface 402 comprises an on-board data (e.g., ODB) bus. In the example shown, sensor interface 400 additionally comprises accelerometer interface 404 for communicating with one or more accelerometers, camera interface 406 for communicating with one or more cameras, proximity sensor interface 408 for communicating with one or more proximity sensors, and GPS sensor interface 410 for communicating with one or more GPS sensors. In some embodiments, sensor interface 400 additionally comprises other interfaces for communicating with other sensors. In some embodiments, vehicle system sensor interface 402 receives reports regarding a vehicle speed of the host vehicle of an event recorder and a distance to a forward vehicle. In some embodiments, proximity sensor interface 408 receives reports regarding a distance to a forward vehicle.

Figure 5:
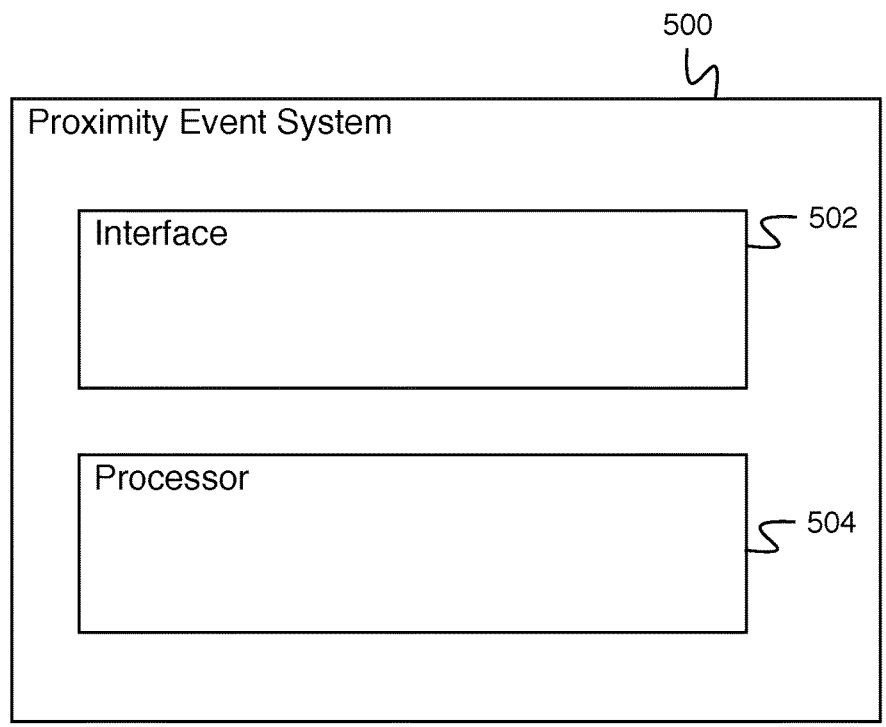
FIG. 5 is a block diagram illustrating an embodiment of a proximity event system.

FIG. 5 is a block diagram illustrating an embodiment of a proximity event system. In some embodiments, proximity event system 500 comprises proximity event system 306 of FIG. 3. In some embodiments, received lane change information is determined by lane change determiner 308 of FIG. 3. In the example shown, proximity event system 500 comprises interface 502 and processor 504. In various embodiments, interface 502 comprises an input interface for receiving a lane change information, an input interface for receiving a host vehicle speed, an input interface for receiving proximity data, an output interface for providing proximity events, or any other appropriate interface. In the example shown, processor 504 comprises a processor for determining a proximity event based at least in part on lane change information (e.g., lane change information received by interface 502). In some embodiments, interface 502 is implemented using a processor. In some embodiments, interface 502 is implemented using processor 504. In some embodiments, one or more processors used to implement elements of proximity event system 500 are used to implement other systems (e.g., other event systems, sensor interfaces, communications systems, etc.).

Figure 6:
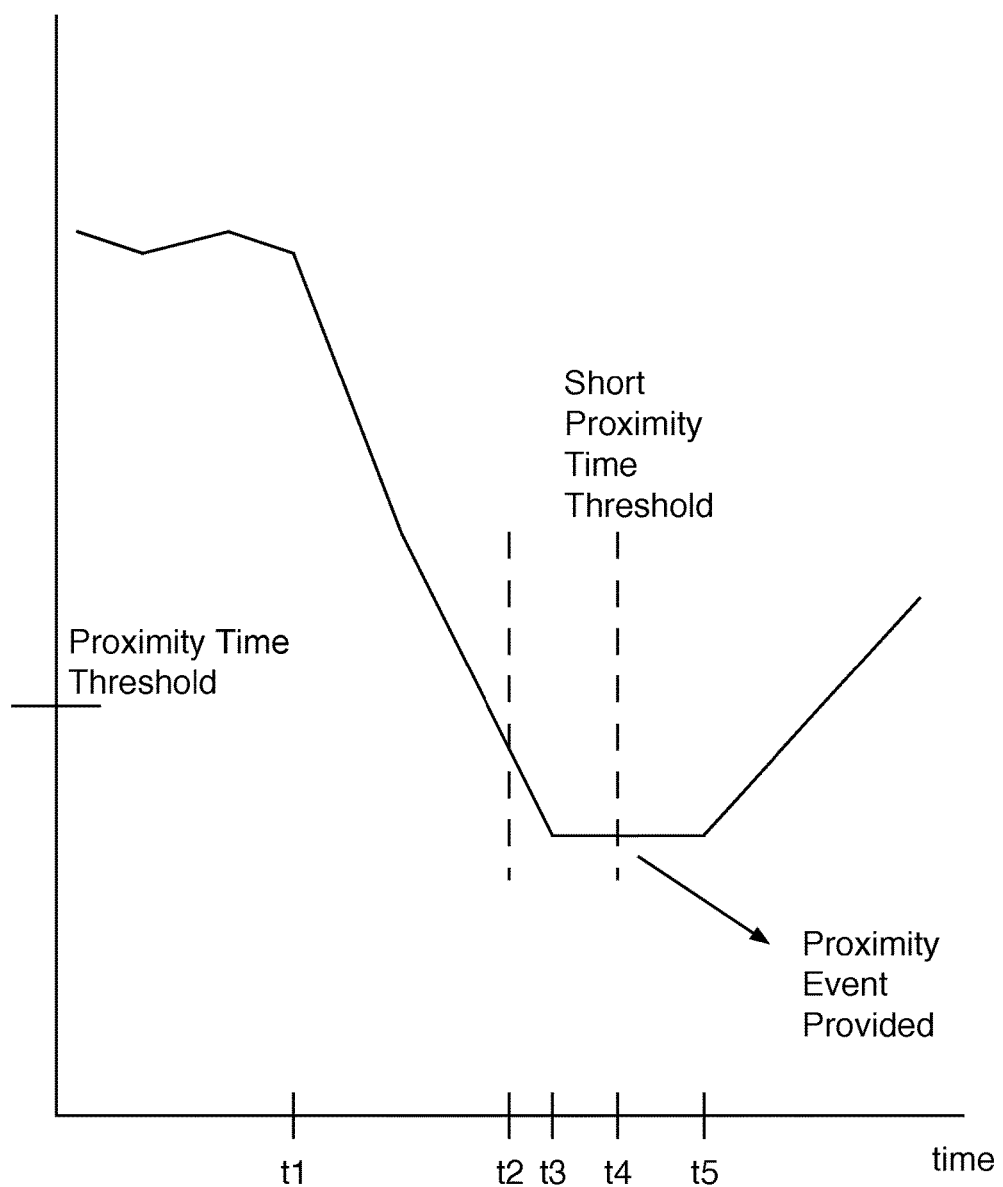
FIG. 6 is a diagram illustrating an embodiment of proximity data showing a proximity event.

FIG. 6 is a diagram illustrating an embodiment of proximity data showing a proximity event. In some embodiments, the data shown in FIG. 6 comprises proximity data (e.g., data received via proximity sensor interface 408 of FIG. 4). In the example shown, a graph is depicted with the y-axis of proximity to the vehicle as a function of time. The data of the graph has a value of proximity near to a time close to the time=0 that is at a typical proximity level (e.g., an appropriate following distance). At a first time (e.g., time t1), the measured proximity begins to drop (e.g., indicating that the vehicle is approaching a vehicle in front of it). The proximity (e.g., as measured using a proximity sensor) drops until it crosses a proximity time threshold at time t2 and hits a minimum at time t3. The proximity begins increasing at time t5 but not before a proximity event has been triggered at time t4—for example, the proximity event is triggered after the proximity is below the proximity time threshold for a duration of time past time t2 of a sustained proximity time threshold (e.g., the proximity has been below the proximity time threshold for a period of time equal to or longer than the short proximity time threshold). A proximity event is provided by a proximity event system (e.g., proximity event system 500 of FIG. 5). In some embodiments, the proximity event is queued to be held for a queue time before it is provided. In some embodiments, the proximity time threshold is the minimum time the driver needs to react, break and come to a full stop to avoid impact with a forward vehicle if that vehicle comes to a sudden stop. In some embodiments, a proximity time threshold of 4 seconds is used when driving at freeway speed. In some embodiments, the proximity time threshold is adjusted based at least in part on the vehicle type as the stopping ability depends on the vehicle type's brakes and tires. In some embodiments, the proximity time threshold is adjusted based at least in part on weather conditions—for example, in rain or snow a higher proximity time threshold is used as wet surfaces reduce friction making it harder for the tires to grip and slow down. In some embodiments, the short proximity time threshold is the time needed to estimate that the driver is not taking corrective action and keeps sustaining a risky distance to the forward vehicle. In some embodiments, the short proximity time threshold is set to 2 seconds. In various embodiments, the proximity time threshold and/or the short proximity time threshold are configurable, are dynamically configurable (e.g., based on environmental conditions—for example, weather, lighting, traffic, etc.), or any other appropriate manner of setting the thresholds.

Figure 7:
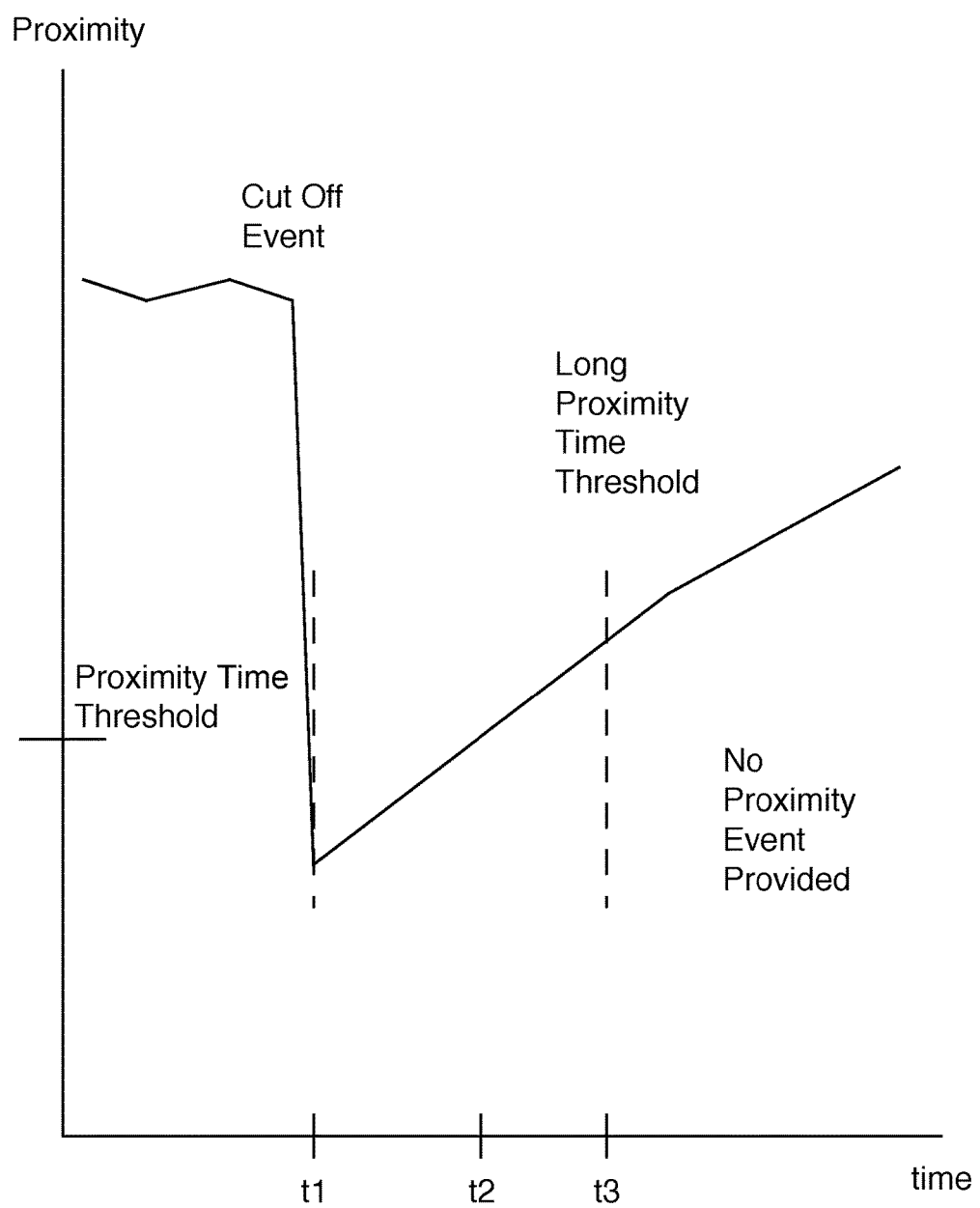
FIG. 7 is a diagram illustrating an embodiment of proximity data showing a cut off event.

FIG. 7 is a diagram illustrating an embodiment of proximity data showing a cut off event. In some embodiments, the data shown in FIG. 7 comprises proximity data (e.g., data received via proximity sensor interface 408 of FIG. 4). In the example shown, a graph is depicted with the y-axis of proximity to the vehicle as a function of time. The data of the graph has a value of proximity near to a time close to the time=0 that is at a typical proximity level (e.g., an appropriate following distance). At a first time (e.g., time t1), the measured proximity drops rapidly (e.g., a distance of greater than a cut off distance threshold in a time less than a cut off time threshold, or faster than would be typical for an approaching a car, e.g., in a discontinuous fashion). For example, in a case where the proximity distance is determined by radar, measured as a round number of meters and reported every 0.1 seconds, a cut off threshold of 1 meter and a cut off time threshold of 0.1 seconds can be applied. In this case, in the event that a current proximity distance is lower than the previous proximity distance by more than 1 meter, it is determined that the proximity distance has dropped rapidly. In some embodiments, the cut off threshold distance depends at least in part on the resolution and accuracy of the sensor measuring the distance—for example, a system using a machine vision sensor to detect forward vehicles and their distances which has lower accuracy than a system using radar technology adopts a higher cut off threshold. In some embodiments, the rapid drop in proximity comprises a cut off event (e.g., the vehicle was cut off by another vehicle changing lanes closely in front of it). In some embodiments, when a cut off event is detected, the sustained proximity time threshold for determining a proximity event changes from a short proximity time threshold to a long proximity time threshold (e.g., the driver has additional time to return to an appropriate following distance after being cut off). At time t2, the measured proximity increases past the proximity time threshold, well before the long proximity time threshold (e.g., the extended sustained proximity time threshold) occurs at time t3. No proximity event is provided (e.g., to a server, to be stored on a server, etc.) even though the measured proximity was below the proximity threshold for longer than the short proximity time threshold (e.g., the non-extended sustained proximity time threshold. In various embodiments, the extended sustained proximity time threshold is configurable, is dynamically configurable (e.g., based on environmental conditions—for example, weather, lighting, traffic, etc.), or any other appropriate manner of setting the threshold.

Figure 8:
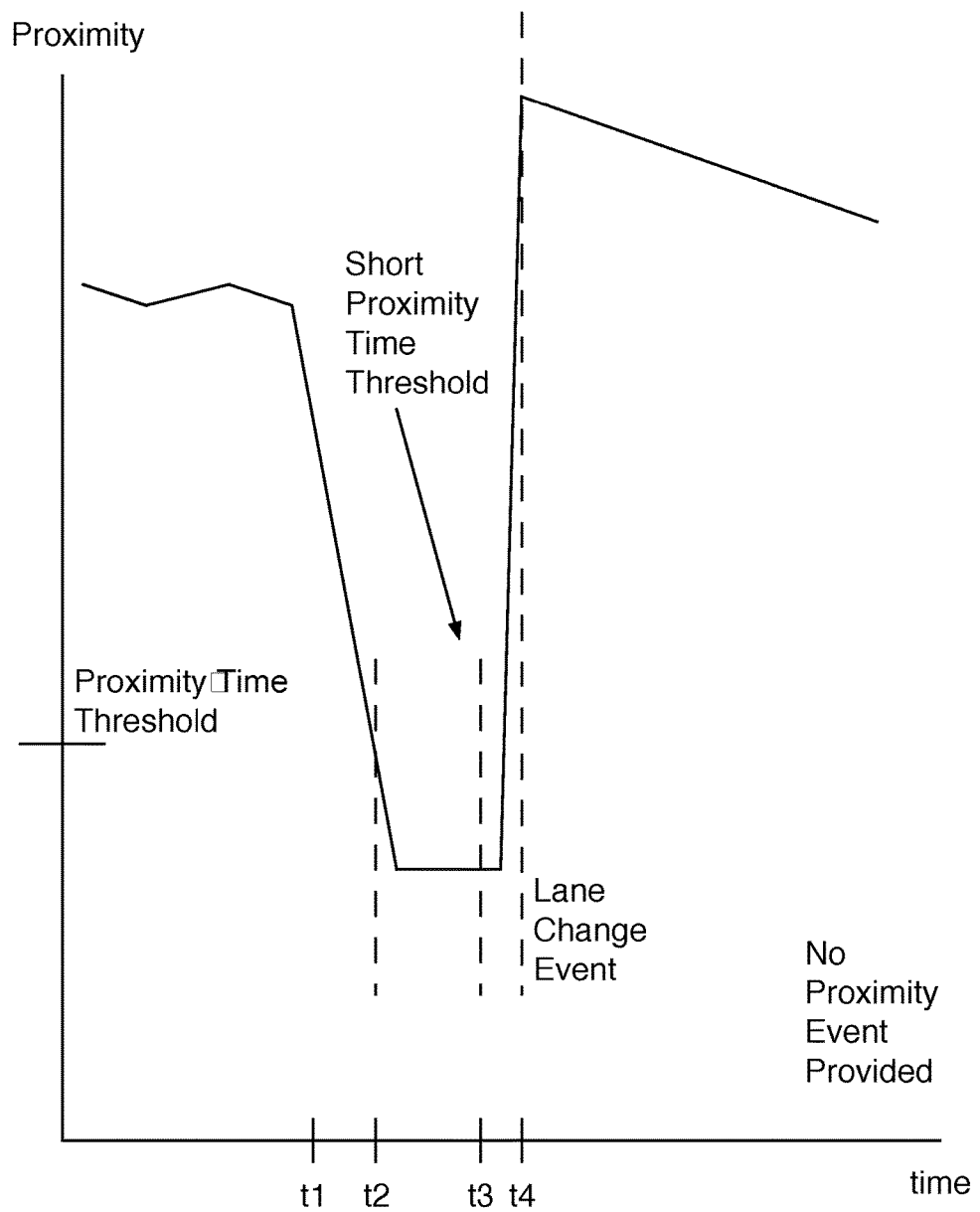
FIG. 8 is a diagram illustrating an embodiment of proximity data showing a lane change event performed by the host vehicle.

FIG. 8 is a diagram illustrating an embodiment of proximity data showing a lane change event performed by the host vehicle. In some embodiments, the data shown in FIG. 8 comprises proximity data (e.g., data received via proximity sensor interface 408 of FIG. 4). In the example shown, a graph is depicted with the y-axis of proximity to the vehicle as a function of time. The data of the graph has a value of proximity near to a time close to the time=0 that is at a typical proximity level (e.g., an appropriate following distance). At a first time (e.g., time t1) the measured proximity begins to drop (e.g., the vehicle is approaching the vehicle in front of it). The proximity crosses the proximity time threshold at time t2 (e.g., the driver is now following too close). At time t3, the short proximity time threshold (e.g., the sustained proximity time threshold) is crossed, and a proximity event is created. In some embodiments, the proximity event is queued for a queue time. At time t4 (e.g., before the queue time), the measured proximity increases rapidly (e.g., faster than would be typical for moving away from a vehicle, e.g., in a discontinuous fashion). In some embodiments, the rapid rise in proximity comprises a lane change event (e.g., the vehicle changed lanes so that it is no longer behind the vehicle it was previously in close proximity to). In some embodiments, when a lane change event is detected, any queued proximity events are removed (e.g., the proximity event created at time t3 is removed from the queue) because the driver was in control of the situation and drove with a proximity distance under the proximity time threshold only to get close to the forward vehicle before changing lanes to pass the forward vehicle. No proximity event is provided even though the measured proximity was below the proximity time threshold for longer than the short proximity time threshold (e.g., the sustained proximity time threshold).

Figure 9:
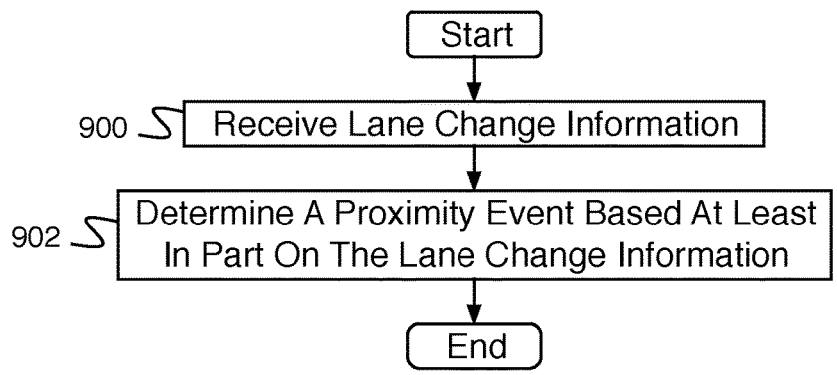
FIG. 9 is a flow diagram illustrating an embodiment of a process for determining proximity events.

FIG. 9 is a flow diagram illustrating an embodiment of a process for determining proximity events. In some embodiments, the process of FIG. 9 is implemented by a proximity event system (e.g., proximity event system 500 of FIG. 5). In the example shown, in 900, lane change information is received. In some embodiments, lane change information is received from a lane change determiner (e.g., lane change determiner 308 of FIG. 3). In 902, a proximity event is determined based at least in part on the lane change information.

Figure 10:
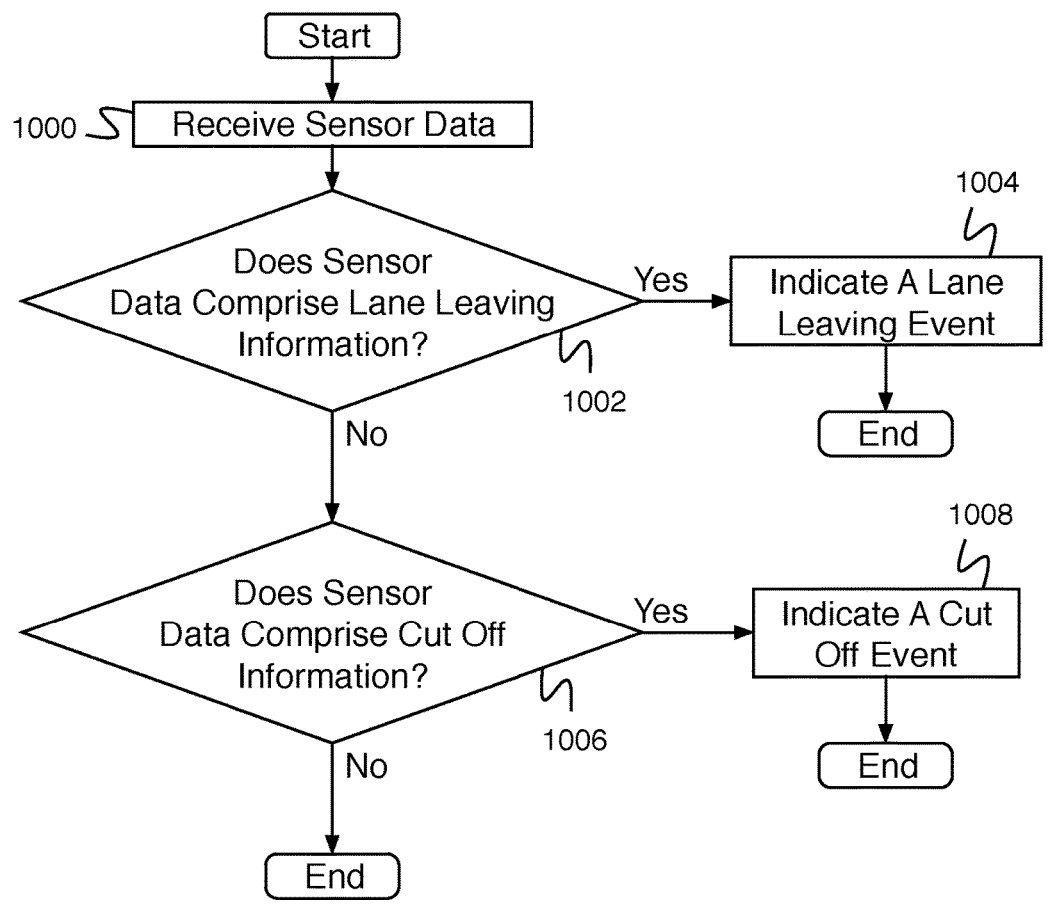
FIG. 10 is a flow diagram illustrating an embodiment of a process for determining lane change information.

FIG. 10 is a flow diagram illustrating an embodiment of a process for determining lane change information. In some embodiments, the process of FIG. 10 is executed by a lane change determiner (e.g., lane change determiner 308 of FIG. 3). In some embodiments, lane change information comprises lane change information received by a process for determining proximity events (e.g., received in 900 of FIG. 9). In the example shown, in 1000, sensor data is received. In various embodiments, sensor data comprises vehicle system sensor data, accelerometer data, camera data, proximity sensor data, GPS data, or any other appropriate sensor data. In 1002, it is determined whether the sensor data comprises lane leaving information. In various embodiments, lane leaving information comprises an indication from a vision system of a vehicle leaving a lane (e.g., an indication determined based at least in part on a lane marker), lane leaving information comprises a rapid increase in proximity (e.g., an increase rapid enough to indicate a lane shift to immediately behind another vehicle), or lane leaving information comprises any other appropriate lane leaving information. In the event it is determined that the sensor data does not comprise lane leaving information, control passes to 1006. In some embodiments, it is indicated that sensor data does not comprise lane leaving information in the event that it is determined that the sensor data does not comprise lane leaving information. In the event it is determined that the sensor data comprises lane leaving information, control passes to 1004. In 1004, a lane leaving event is indicated, and the process ends. In 1006, it is determined whether the sensor data comprises cut off information. In various embodiments, cut off information comprises a rapid decrease in proximity (e.g., indicating being cut off by another vehicle), identification of a vehicle in a forward facing camera (e.g., the vehicle performing the cut off), or cut off information comprises any other appropriate cut off information. In the event it is determined that the sensor data does not comprise cut off information, the process ends. In some embodiments, it is indicated that the sensor data does not comprise cut off information in the event it is determined that the sensor data not comprise cut off information. In the event it is determined that the sensor data comprises cut off information, control passes to 1008. In 1008, a cut off event is indicated.

Figure 11:
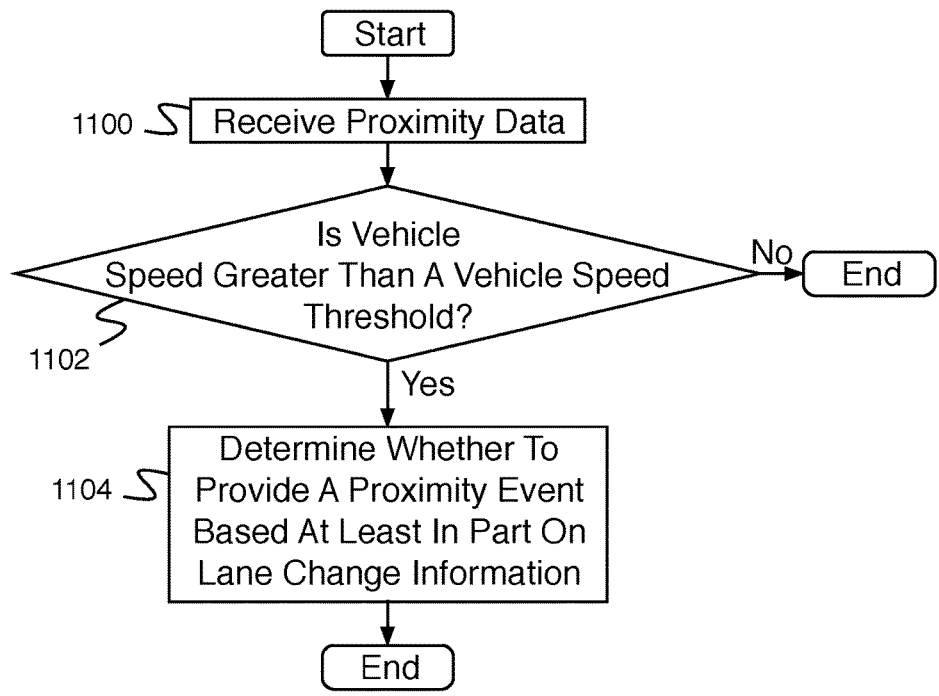
FIG. 11 is a flow diagram illustrating an embodiment of a process for determining a proximity event based at least in part on lane change information.

FIG. 11 is a flow diagram illustrating an embodiment of a process for determining a proximity event based at least in part on lane change information. In some embodiments, the process of FIG. 11 implements 902 of FIG. 9. In the example shown, in 1100, proximity data is received. In some embodiments, proximity data is received from a proximity sensor (e.g., via proximity sensor interface 408 of FIG. 4). In 1102, it is determined whether the vehicle speed is greater than a vehicle speed threshold. In some embodiments, determining whether the vehicle speed is greater than a vehicle speed threshold comprises determining a vehicle speed. In some embodiments, a vehicle speed is received from a vehicle system sensor (e.g., via vehicle system sensor interface 402 of FIG. 4). In some embodiments, in the event a vehicle speed is below a vehicle speed threshold (e.g., 20 miles per hour), proximity events are not detected (e.g., the vehicle can navigate safely in close proximity to other vehicles at slow speeds). In the event it is determined that the vehicle speed is not greater than a vehicle speed threshold, the process ends. In some embodiments, it is indicated that the vehicle speed is not greater than a vehicle speed threshold in the event that it is determined that the vehicle speed is not greater than a vehicle speed threshold. In the event it is determined that the vehicle speed is greater than the vehicle speed threshold, control passes to 1104. In some embodiments, it is indicated that the vehicle speed is greater than a vehicle speed threshold in the event that it is determined that the vehicle speed is greater than a vehicle speed threshold. In 1104, the process determines whether to provide a proximity event based at least in part on lane change information. In various embodiments, it is indicated that a proximity event is provided, that a proximity event is not provided, or any other appropriate indication.

Figure 12:
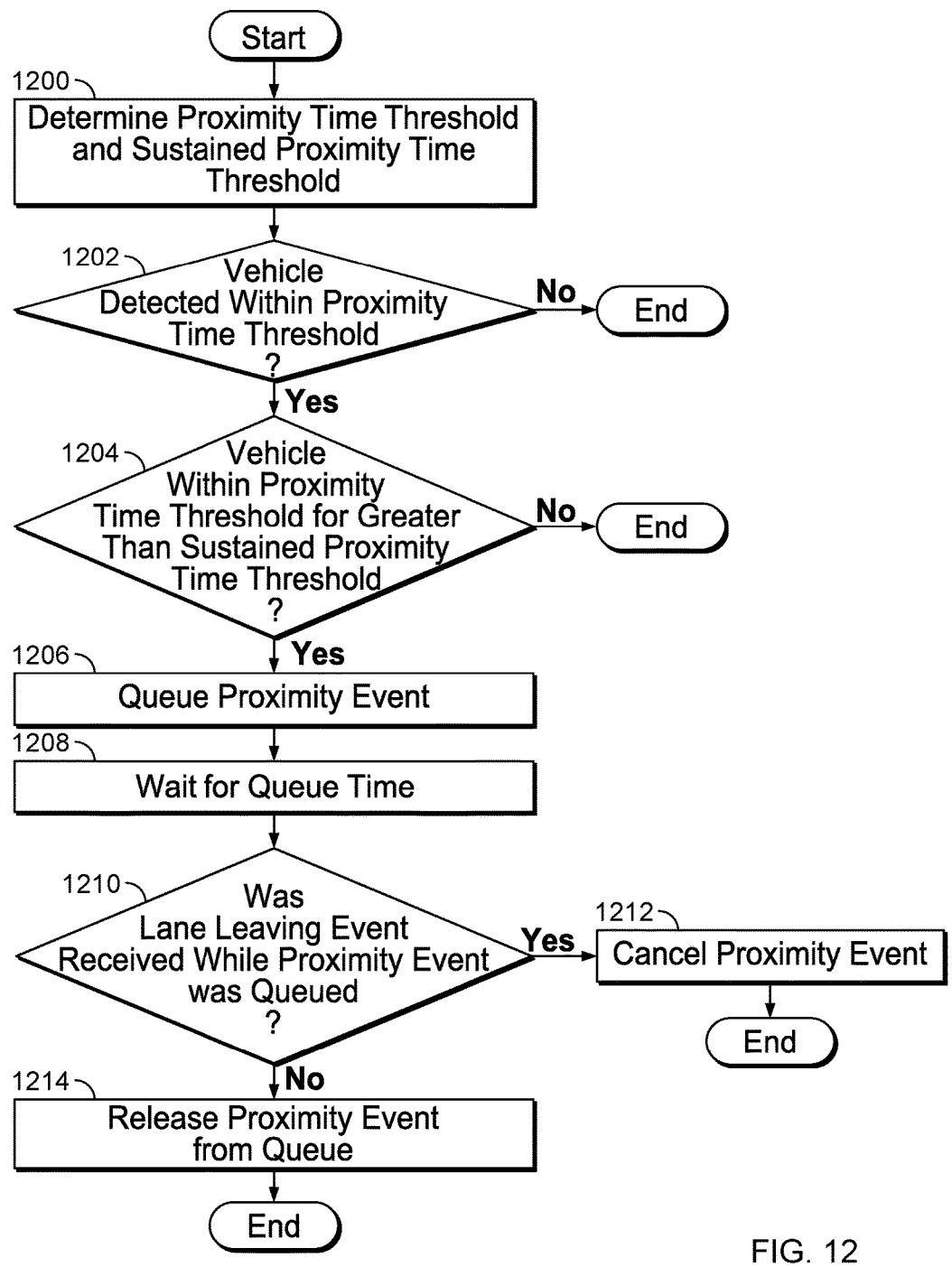
FIG. 12 is a flow diagram illustrating an embodiment of a process for determining whether to provide a proximity event based at least in part on lane change information.

FIG. 12 is a flow diagram illustrating an embodiment of a process for determining whether to provide a proximity event based at least in part on lane change information. In some embodiments, the process of FIG. 12 implements 1104 of FIG. 11. In the example shown, in 1200, a proximity time threshold and a sustained proximity time threshold are determined. In some embodiments, a sustained proximity time threshold is determined based at least in part on a cut off event. In some embodiments, a proximity time threshold is determined based at least in part on vehicle deceleration information. In 1202, it is determined whether there is a vehicle detected within a proximity time threshold (e.g., whether a proximity sensor detects a vehicle within a proximity time threshold). In some embodiments, the proximity time threshold is based at least in part on the vehicle speed (e.g., the proximity time threshold comprises a longer time at higher speeds). In the event it is determined that no vehicle is detected within a proximity time threshold, the process ends. In some embodiments, it is indicated that no vehicle is detected within a proximity time threshold in the event it is determined that no vehicle is detected within a proximity time threshold. In the event it is determined that a vehicle is detected within a proximity time threshold, control passes to 1204. In some embodiments, it is indicated that a vehicle is detected within a proximity time threshold in the event it is determined that a vehicle is detected within a proximity time threshold. In 1204, it is determined whether a vehicle is within the proximity time threshold for greater than the sustained proximity time threshold. In the event it is determined that a vehicle is not within the proximity time threshold for greater than the sustained proximity time threshold, the process ends. In some embodiments, it is indicated that a vehicle is not within the proximity time threshold for greater than the sustained proximity time threshold, in the event that it is determined that a vehicle is not within the proximity time threshold for greater than the sustained proximity time threshold. In the event it is determined that a vehicle is within the proximity time threshold for greater than the sustained proximity time threshold, control passes to 1206. In 1206 a proximity event is queued. In some embodiments, a proximity event is queued for a queue time before it is provided. In 1208, the process waits for the queue time. In 1210, it is determined whether a lane leaving event was received while the proximity event was queued. In the event it is determined that a lane leaving event was not received while the proximity event was queued, control passes to 1214. In the event it is determined that a lane leaving event was received while the proximity event was queued, control passes to 1212. In 1212, the proximity event is cancelled, and the process ends. In various embodiments, cancelling the event comprises indicating to cancel the proximity event, indicating that the proximity event is cancelled, or any other appropriate indication. In 1214, the proximity event is released from the queue. In various embodiments, releasing the proximity event from the queue comprises providing the proximity event, logging the proximity event, uploading the proximity event, or processing the proximity event in any other appropriate way.

Figure 13:
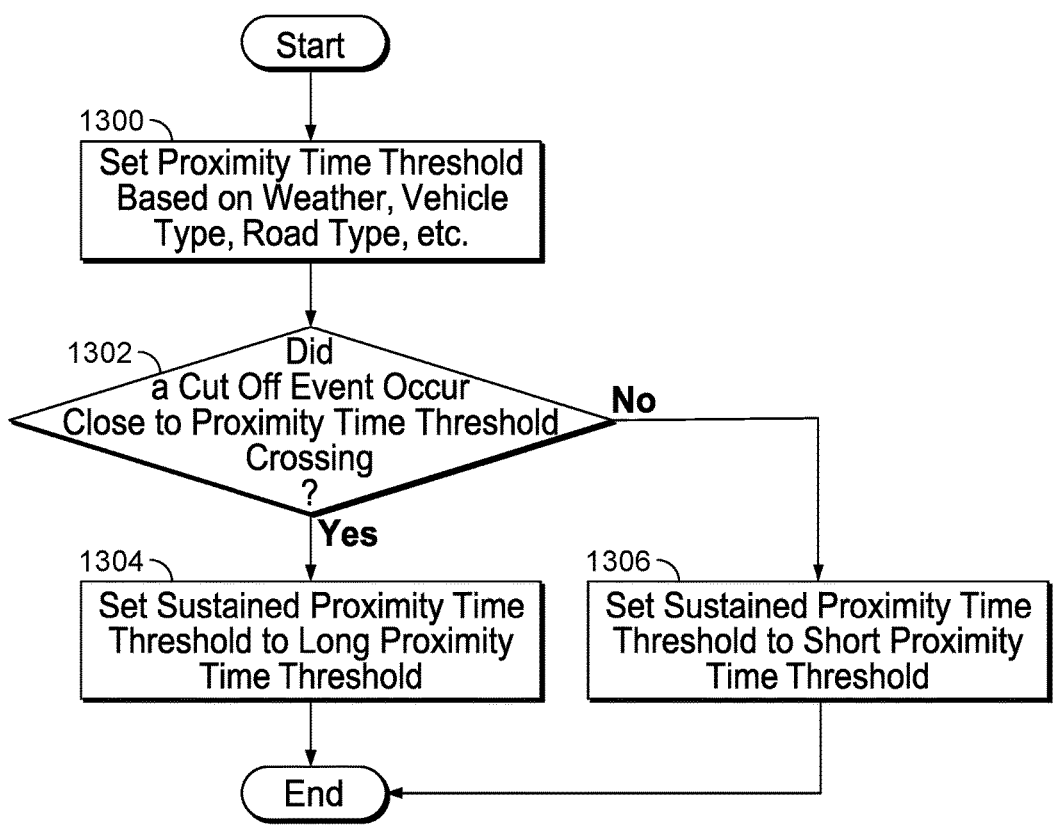
FIG. 13 is a flow diagram illustrating an embodiment of a process for determining a sustained proximity time threshold.

FIG. 13 is a flow diagram illustrating an embodiment of a process for determining a sustained proximity time threshold. In some embodiments, the process of FIG. 13 implements 1200 of FIG. 12. In the example shown, in 1300, proximity time threshold is set based on weather, vehicle type, road type, etc. For example, the proximity time threshold represents the minimum time a driver needs to react, brake and come to a full stop to avoid impact with a forward vehicle in the event that the forward vehicle comes to a sudden stop. For example, a newer compact car with anti-lock braking system uses a proximity time threshold of 2.5 seconds and a sustained proximity time threshold of 2 seconds, while a heavy truck not equipped with anti-lock braking system uses a proximity time threshold of 4 seconds and a sustained proximity time threshold of 3 seconds; both proximity time thresholds are increased by 50% in the case of raining or snowing conditions. In 1302, it is determined whether a cut off event occurs close to proximity threshold crossing. In the event that a cut off event occurred close to proximity time threshold crossing, in 1304 a sustained proximity time threshold is set to a long proximity time threshold. For example, in the event that a compact car equipped with anti-lock braking system is following another vehicle with a proximity time of 5 seconds (i.e., a proximity time that is over the proximity time threshold) and a vehicle from an adjacent lane cuts in between producing suddenly a the proximity time of 1.5 seconds (i.e., a proximity time that is under the proximity time threshold), the sustained proximity time threshold is now increased from 2 to 3 seconds to allow the driver extra time to take corrective action and eliminate the risk generated by the vehicle that cut in front of the vehicle. In the event that a cut off event did not occur close to proximity time threshold crossing, in 1306 a sustained proximity time threshold is set to a short proximity time threshold. For example, a compact car equipped with anti-lock braking system has a short proximity time threshold set to 2 seconds (e.g., its default sustained proximity time threshold).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining lane change information, comprising:
   an input interface configured to receive sensor-collected data of vehicle behavior; and
   a processor configured to:
      determine the lane change information based at least in part on:
         determining a lane leaving event responsive to a determination that the sensor-collected data includes lane leaving information, and
         determining a cut off event responsive to a determination that the sensor-collected data includes cut off information, wherein the cut off information is based at least in part on sensor-collected data including information about a vehicle in front of a current vehicle; and
      output the lane change information.

2. The system of claim 1, wherein the determination of a lane leaving event is based at least in part on an indication from a vision system of a vehicle leaving a lane.

3. The system of claim 1, wherein the determination of a lane leaving event is based at least in part on an increase in proximity between two vehicles meeting a threshold.

4. The system of claim 1, wherein the determination of a cut off event is based at least in part on identification of a vehicle in a forward facing camera.

5. The system of claim 1, wherein the determination of a cut off event is based at least in part on an increase in proximity between two vehicles meeting a threshold.

6. The system of claim 1, wherein the processor is further configured to determine a proximity event based at least in part on the lane change information.

7. The system of claim 6, wherein the determination of the proximity event is performed in response to a determination that vehicle speed is above a speed threshold.

8. The system of claim 6, wherein the processor is further configured to:
   determine that a vehicle speed is greater than a threshold; and
   responsive to the determination that a vehicle speed is greater than a threshold, determine that a proximity event is to be provided based at least in part on the lane change information.

9. The system of claim 8, wherein the determination of that a proximity event is to be provided includes:
   determining a proximity time threshold;
   detecting absence of a vehicle within the proximity time threshold.

10. The system of claim 9, wherein the proximity time threshold is based at least in part on vehicle deceleration.

11. The system of claim 9, wherein the proximity time threshold is proportional to vehicle speed.

12. The system of claim 8, wherein the determination that a proximity event is to be provided includes:
    determining a proximity time threshold;
    determining a sustained proximity time threshold;
    detecting a vehicle within the proximity time threshold; and
    responsive to the detection of the vehicle within the proximity time threshold, detecting a vehicle within the proximity time threshold for less than or equal to the sustained proximity time threshold.

13. The system of claim 12, wherein the sustained proximity time threshold is based at least in part on the cut off event.

14. The system of claim 6, wherein the processor is further configured to:
    determine that a vehicle speed is greater than a threshold; and
    responsive to the determination that a vehicle speed is greater than a threshold, determine that a proximity event is to be canceled based at least in part on:
    determining a proximity time threshold;
    determining a sustained proximity time threshold;
    detecting a vehicle within the proximity time threshold;
    responsive to the detection of the vehicle within the proximity time threshold, detecting a vehicle within the proximity time threshold for greater than the sustained proximity time threshold;
    queuing the proximity event; and
    determining that the lane leaving event was received while the proximity event was queued.

15. The system of claim 14, wherein, subsequent to queuing the proximity event, waiting for a queue time.

16. The system of claim 6, wherein the processor is further configured to:
    determine that a vehicle speed is greater than a threshold; and
    responsive to the determination that a vehicle speed is greater than a threshold, determine that a proximity event is to be released from a queue based at least in part on:
    determining a proximity time threshold;
    determining a sustained proximity time threshold;
    detecting a vehicle within the proximity time threshold;
    responsive to the detection of the vehicle within the proximity time threshold, detecting a vehicle within the proximity time threshold for greater than the sustained proximity time threshold;
    queuing the proximity event; and
    determining that the lane leaving event was not received while the proximity event was queued.

17. The system of claim 16, wherein the processor is further configured to, responsive to a determination that the proximity event is to be released from the queue, log the proximity event.

18. The system of claim 16, wherein the processor is further configured to, responsive to a determination that the proximity event is to be released from the queue, upload the proximity event.

19. The system of claim 1, wherein the processor is further configured to increase a proximity time threshold for detecting a proximity event in response to the determination of a cut off event.

20. A method to determine lane change information, comprising:
- receiving, via an input interface, sensor-collected data of vehicle behavior;
- determining, by a processor, the lane change information based at least in part on:
  - determining a lane leaving event responsive to a determination that the sensor-collected data includes lane leaving information, and
  - determining a cut off event responsive to a determination that the sensor-collected data includes cut off information, wherein the cut off information is based at least in part on sensor-collected data including information about a vehicle in front of a current vehicle; and
- outputting the lane change information.

21. A computer program product for determining lane change information, the computer program product being embodied in a non-transitory computer readable storage medium and comprising computer instructions for:
- receiving sensor-collected data of vehicle behavior;
- determining the lane change information based at least in part on:
  - determining a lane leaving event responsive to a determination that the sensor-collected data includes lane leaving information, and
  - determining a cut off event responsive to a determination that the sensor-collected data includes cut off information, wherein the cut off information is based at least in part on sensor-collected data including information about a vehicle in front of a current vehicle; and
- outputting the lane change information.

* * * * *